UNITED STATES PATENT OFFICE.

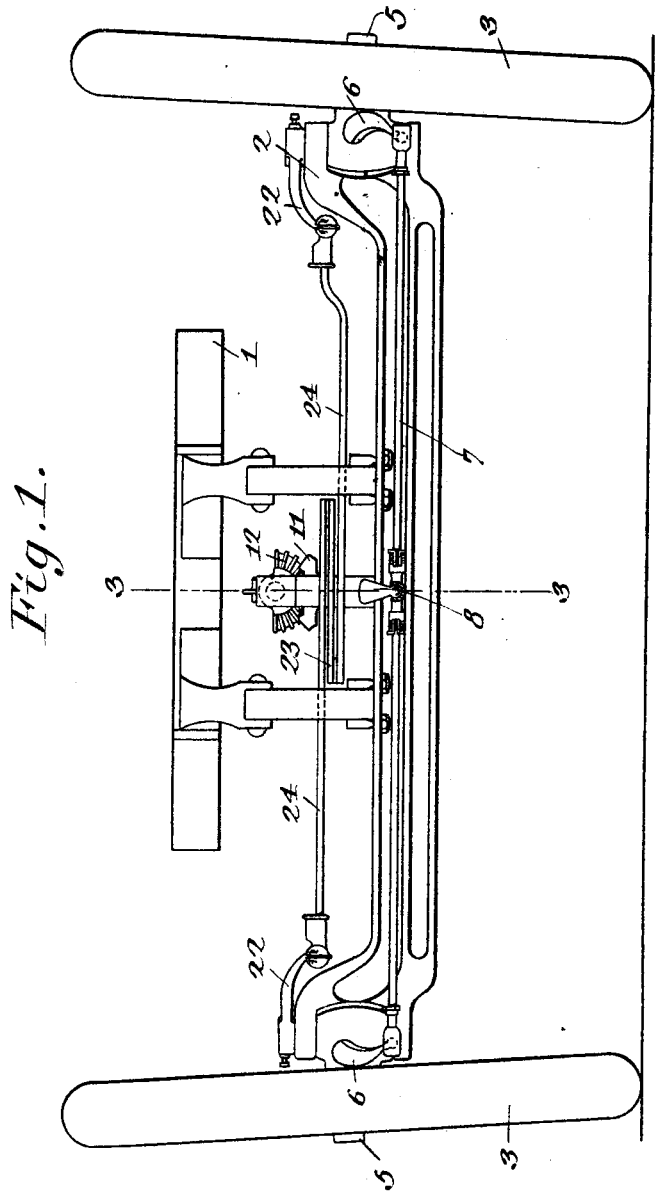

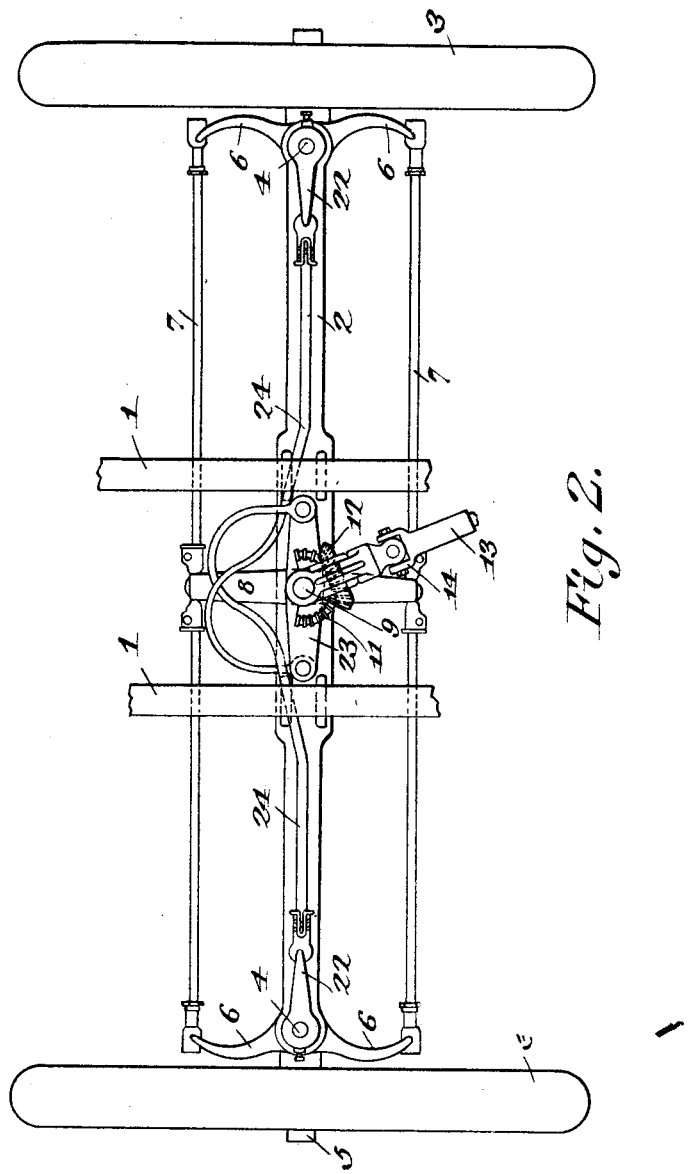

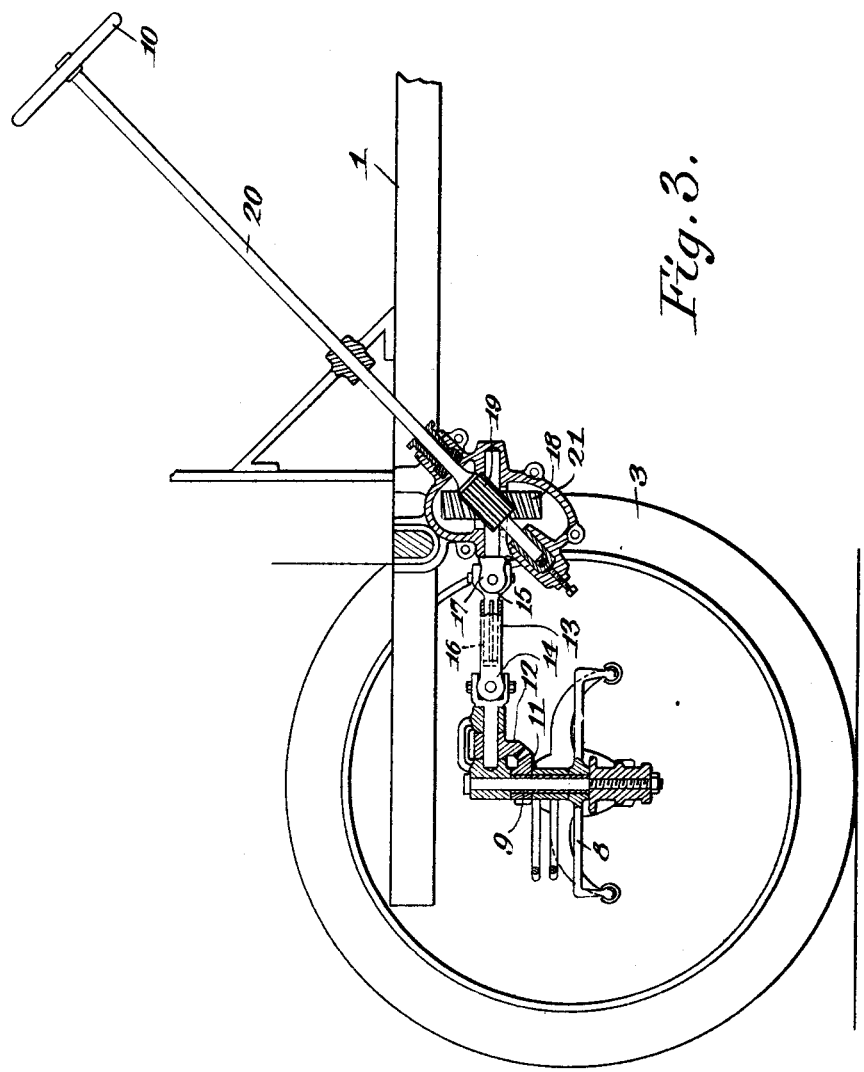

FRANK E. LAKE, OF GUADALAJARA, MEXICO.

STEERING APPARATUS FOR MOTOR-VEHICLES.

1,031,347.  Specification of Letters Patent.  Patented July 2, 1912.

Application filed July 24, 1907. Serial No. 385,391.

*To all whom it may concern:*

Be it known that I, FRANK E. LAKE, a citizen of the United States, and a resident of Guadalajara, in the State of Jalisco, Mexico, have invented certain new and useful Improvements in Steering Apparatus for Motor-Vehicles, of which the following is a description.

My invention relates to steering apparatus for motor vehicles, and it has for its object the construction of a vehicle frame and a steering apparatus in such a way that the steering wheels which are pivoted to the vehicle frame may be turned on their pivots at a very large angle from their normal or straight ahead position, so that the vehicle may be turned in a very small space, I also provide additional means for positively returning the steering wheels to normal position after they have been turned aside through a large angle.

In motor vehicles as they are now constructed, it is impracticable for the steering wheels to be turned on their pivots through a large angle by reason of the fact that the steering arm on the knuckle joint boss, which forms the pivot on which the steering wheels turn, soon comes substantially into line with its actuating link, and when power is applied to the link to return the steering arm and steering wheel to normal position, the parts are on a dead center or else the leverage is so short that the construction cannot be depended upon to bring the steering wheel back to the straight ahead position. In vehicles provided with a steering device constructed according to my invention, this difficulty is obviated by the provision of additional and separate means for returning the steering wheels to the normal position after they have been turned aside through a large angle.

Attention is directed to the accompanying drawings forming a part of this specification, wherein the same reference numerals are uniformly applied to the same parts, and in which—

Figure 1 is a front elevational view of a motor vehicle frame and steering apparatus embodying one form of my invention; Fig. 2 is a plan view of the parts shown in Fig. 1, a portion of the vehicle frame being broken away, and Fig. 3 is a cross-sectional view taken on the line 3—3 of Fig. 1, and also showing in addition to the parts shown in Fig. 1, and partly in cross-section, the control-wheel and its shafts, and the device for connecting same to the steering wheels.

The vehicle frame 1 is made extremely narrow in front where it is supported by the forward axle 2 in order to provide room for the steering wheels 3 to be turned through as large an angle as may be desired from their normal or straight ahead position. The forward axle 2 is provided with the usual yokes at its ends in which the steering wheels 3 are pivoted by means of the usual knuckle joints which comprise short vertical bosses 4 and stud axles 5 on which the steering wheels turn. Upon the bosses 4, as shown, extending substantially parallel to the steering wheels, are one or more steering arms 6, which are connected by one or more drag links 7. As shown in the drawings, each steering wheel is provided with two such arms 6, and two links 7 are provided but it is obvious that one of the links 7 and the arms coacting therewith may be dispensed with if desired. The links 7 are pivoted near their centers to a crosshead 8, which is connected to a short vertical shaft 9, pivotally supported in the vehicle frame. This vertical shaft is actuated from the control wheel 10, through the beveled gears 11 on the vertical shaft and 12 on the substantially horizontal shaft 13 provided with a universal joint 14, the horizontal shaft 15 having a splined telescoping connection with the shaft 13 as shown at 16, and also being provided with a universal joint 17, the gears 18 and 19 and the steering wheel shaft 20. The gears 18 and 19 are contained in a suitable gear case 21.

The construction thus far described effects the steering of the machine on all ordinary occasions when the steering wheels are turned through but small angles, but when these wheels are to be turned through very large angles, it is necessary to provide additional means for securing the positive return of the pivoted steering wheels to their normal positions. I have shown a construction in the drawings by means of which this end is attained, but it is to be understood that this construction embodies but one form of my invention and that my invention which is as broad as my claims, may be embodied in other forms of apparatus. The construction shown in the drawings for this purpose comprises arms 22 secured to the bosses 4 of the steering wheel knuckle joints and extending substantially parallel to the forward vehicle shaft when the steering wheels are in straight ahead position. Attached to the upright shaft 9 and extending in the same direction as the arms 22 is a second cross-head 23. Links 24, curved to avoid contact with other parts, are pivoted respectively to the arms 22, and to that end of the cross-head 23 farthest from the respective arms 22. When the steering wheels 3 are turned upon their pivots 4 to a large angle, the steering arms 6 and their actuating links 7 come closely into alinement with one another, so that by reason of a dead center or decreased leverage, it is impracticable for these parts to be depended upon to return the steering wheels to normal position. At these times the arms 22 provide the greatest leverage for their actuation by the links 24, and as the control wheel is turned in the direction to restore the steering wheels to normal position, these links 24 acting on the arms 22, readily and positively retract the steering wheels to such position.

I claim:

1. In a motor vehicle, the combination with a vehicle frame, of pivoted steering wheels, controlling means, and two sets of lever and link connections between said means and wheels for turning said wheels on their pivots arranged so that as the leverage of one set decreases with the turning of the wheels, the leverage of the other set increases, substantially as set forth.

2. In a motor vehicle, the combination with the vehicle frame, of pivoted steering wheels, means comprising steering arms and links coöperating with the said arms for turning the steering wheels on their pivots, and additional means comprising arms arranged at an angle to the first named arms, and links coöperating therewith for returning the wheels to straight-ahead position, substantially as described.

3. In a motor vehicle, the combination with the vehicle frame, of pivoted steering wheels, means comprising arms arranged substantially parallel to said wheels for turning the said wheels on their pivots, and additional means comprising arms arranged at an angle to the first named arms for returning the wheels to straight ahead position, substantially as set forth.

4. In a motor vehicle, the combination with the vehicle frame, of pivoted steering wheels, means comprising arms arranged substantially parallel to said wheels for turning the steering wheels on their pivots, and additional means comprising arms arranged at substantially a right angle to the first named arms for returning the wheels to straight ahead position, substantially as set forth.

5. In a motor vehicle, the combination with a vehicle frame, of pivoted steering wheels so mounted as to permit considerable turning movement thereof, controlling means, means controlled thereby including a lever for turning the said wheels on their pivots and having a greater leverage when the wheels are in one position than in another, and additional means controlled by said controlling means also including a lever for turning said wheels on their pivots and having a greater leverage when said wheels are in said second position than when they are in said first position, substantially as set forth.

6. In a motor vehicle, the combination of a frame narrow at one portion, an axle supporting the frame at said narrow portion, steering wheels pivoted upon knuckle joints at the ends of said axle, steering arms secured to the knuckle joint bosses and extending substantially parallel to said steering wheels controlling means, links connecting the said steering arms upon opposite wheels to said means, and movable endwise thereby, additional steering arms secured to said bosses and extending at an angle to the first named steering arms, and links connecting the last named steering arms to said controlling means and movable endwise thereby, substantially as set forth.

This specification signed and witnessed this 5th day of July, 1907.

FRANK E. LAKE.

Witnesses:
 Louis Cuesta,
 L. Angel Morales.